United States Patent
Ikeda

(10) Patent No.: US 6,595,253 B2
(45) Date of Patent: Jul. 22, 2003

(54) PNEUMATIC TIRE INCLUDING CIRCUMFERENTIAL GROOVE HAVING ALTERNATE CONSTANT WIDTH PORTIONS AND WIDENING PORTIONS

(75) Inventor: Akio Ikeda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/725,576

(22) Filed: Nov. 30, 2000

(65) Prior Publication Data

US 2001/0002603 A1 Jun. 7, 2001

(30) Foreign Application Priority Data

Dec. 6, 1999 (JP) ............................................. 11-346687

(51) Int. Cl.$^7$ ........................ B60C 11/03; B60C 101/00; B60C 103/04
(52) U.S. Cl. ............................. 152/209.15; 152/209.18; 152/903; 152/DIG. 3
(58) Field of Search ....................... 152/209.18, 209.28, 152/903, DIG. 3, 209.15, 209.24

(56) References Cited

U.S. PATENT DOCUMENTS

| | | | |
|---|---|---|---|
| 5,759,313 A | | 6/1998 | Shirai et al. |
| 5,766,383 A | * | 6/1998 | Hasegawa et al. |
| 5,837,074 A | * | 11/1998 | Uemura |
| 5,964,266 A | * | 10/1999 | Boiocchi et al. |
| 6,340,040 B1 | * | 1/2002 | Ikeda |

FOREIGN PATENT DOCUMENTS

| | | | |
|---|---|---|---|
| DE | 4232308 A1 | | 3/1994 |
| EP | 0428472 A2 | | 5/1991 |
| EP | 778163 | * | 6/1997 |
| EP | 0857588 A2 | | 8/1998 |
| EP | 0858917 A2 | | 8/1998 |
| JP | 4-146804 | * | 5/1992 |
| JP | 6-106915 | * | 4/1994 |
| JP | 6-171312 | * | 6/1994 |
| JP | 8-300908 | * | 11/1996 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread portion provided between the tire equator and each tread edge with a continuous main circumferential groove and outer lateral grooves, the outer lateral grooves including alternately arranged wide lateral grooves and narrow lateral grooves each extending axially outwardly from the main circumferential groove, the axially inner groove-wall of the main circumferential groove extending substantially straight in the circumferential direction, the axially outer groove-wall of the main circumferential groove comprising circumferential portions and inclined portions, the circumferential portions extending substantially straight so that the width of the main circumferential groove is substantially constant, and the inclined portions inclined so that the width of the main circumferential groove increases from the narrow lateral grooves to the wide lateral grooves.

5 Claims, 5 Drawing Sheets

PNEUMATIC TIRE INCLUDING CIRCUMFERENTIAL GROOVE HAVING ALTERNATE CONSTANT WIDTH PORTIONS AND WIDENING PORTIONS

The present invention relates to a pneumatic tire, more particularly to a tread structure being capable of improving wet performance and noise performance.

In order to improve wet performance of a tire, the volume of circumferential grooves and lateral grooves in the tread portion may be increased, but so called air-tube resonance is liable to occur and so called pitch noise increases. The air-tube resonance is a resonance of air in a circumferential groove in the ground contacting patch of the tire. The pitch noise is a noise generated by periodical contact of lateral grooves with a road surface.

Conventionally, to reduce such pitch noise, circumferential pitches of the lateral grooves are varied irregularly around the circumference of the tire. However, to maintain the required resistance to uneven wear, steering stability and the like, variation can not be so large. Thus, the pitch noise reduction by pitch variation has its limit. As to the air-tube resonance noise, it can be reduced by decreasing the main circumferential groove width or employing a zigzag circumferential groove, but in either case the wet performance deteriorates. Therefore, based on a compromise between noise performance and wet performance, the width and volume of the circumferential grooves are determined.

It is therefore, an object of the present invention to provide a pneumatic tire in which both the wet performance and noise performance are improved.

According to the present invention, a pneumatic tire comprises a tread portion provided between the tire equator and each tread edge with a circumferentially continuous main circumferential groove and circumferentially spaced outer lateral grooves, the outer lateral grooves including wide lateral grooves and narrow lateral grooves arranged alternately in the tire circumferential direction, each said outer lateral groove extending axially outwardly from the main circumferential groove while inclining at a certain angle with respect to the circumferential direction of the tire, the main circumferential groove having an axially inner groove-wall and an axially outer groove-wall, said axially inner groove-wall extending substantially straight in the circumferential direction, said axially outer groove-wall comprising circumferential portions and inclined portions each between the wide lateral grooves and narrow lateral grooves, said circumferential portions extending substantially straight in the circumferential direction so that the width of the main circumferential groove is substantially constant, and said inclined portions inclined so that the width of the main circumferential groove increases from the narrow lateral grooves to the wide lateral grooves, whereby the main circumferential groove has alternate constant width portions and widening portions.

Therefore, pitch noise is dispersed into a wider frequency range and improved owing to the alternate wide and narrow lateral grooves. The alternate constant width portions and widening portions prevent the occurrence of air resonance in the main circumferential groove and the air resonance noise can be improved. Further, in the widening portions, as the width of the main circumferential groove increases from the narrow lateral grooves towards the wide lateral grooves, the drainage from the main circumferential groove to the wide lateral grooves is increased, and the wet performance, especially aquaplaning performance can be improved.

An embodiment of the present invention will now be described in detail according to the accompanying drawings.

Figure 1:
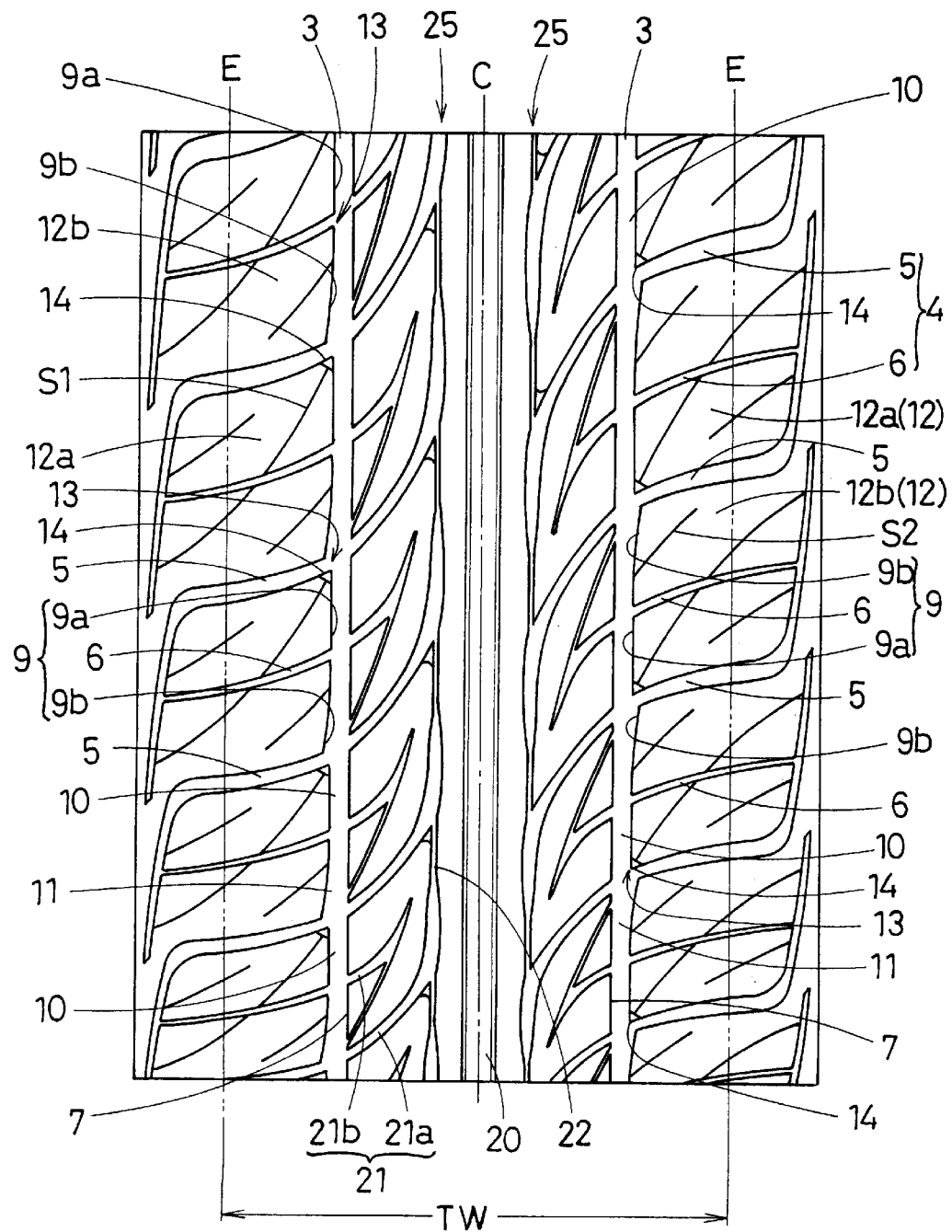
FIG. 1 is a developed plan view of an embodiment of the present invention showing an example of the tread pattern.

In the figures, pneumatic tire 1 according to the present invention comprises a tread portion 2 which is provided between the tire equator C and each tread edge E with a main circumferential groove 3 extending continuously in the tire circumferential direction, and a plurality of circumferentially spaced outer lateral grooves 4 each of which extends axially outwardly from the main circumferential groove 3 and inclines at an angle $\theta$ with respect to the circumferential direction of the tire.

In this embodiment, the pneumatic tire has a size 185/65R14 for passenger cars. The tread portion 2 is provided with a bi-directional tread pattern which is substantially symmetrical about a point on the tire equator C if the pitch variation is ignored.

Here, the tread edge E is one of the axial outermost edges of a ground contacting region under a standard loaded condition in which the tire is mounted on a standard wheel rim and inflated to a standard pressure and loaded with a standard tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The main circumferential groove 3 is a substantially straight groove extending continuously in the tire circumferential direction. In this example, it is disposed at a substantially middle position between the tire equator C and the tread edge E.

The main circumferential groove 3 has, for example, a width GW in a range of from 1 to 6%, preferably 1.2 to 5% of the ground contacting width TW between the tread edges E, and a depth GD in a range of from 4 to 8%, preferably 4 to 6% of the ground contacting width TW. It is however not always necessary to set the width GW and depth GD in these ranges.

The outer lateral grooves 4 include wide lateral grooves 5 and narrow lateral grooves 6 which are arranged alternately in the circumferential direction. The wide lateral grooves 5 and narrow lateral grooves 6 are each extended from the main circumferential groove 3 to the tread edge E to open at the tread edge E. Here, the "wide" lateral groove and "narrow" lateral groove mean that the average width gw1a of the wide lateral groove 5 is more than the average width gw2a of the narrow lateral groove 6. The average width means a groove width gw1, gw2 measured at a right angle to the groove center line and averaged between the main circumferential groove 3 and the tread edge E.

In this example, the width gw1 of the wide lateral groove 5 is less than the width GW of the main circumferential groove 3. But the depth of the wide lateral groove 5 is the substantially same as that of the main circumferential groove 3. The average width gw2a of the narrow lateral groove 6 is set in a range of more than 1.0 mm, preferably more than 1.8 mm. The average width ratio (gw1a/gw2a) is more than 1.0 as explained above, but it is preferably set in a range of from 1.20 to 3.50, more preferably 2.0 to 3.0 to disperse the frequency spectrum of the pitch noise and thereby to improve the noise performance.

In the region between the main circumferential groove 3 and each tread edge E, the outer lateral grooves 4 have an inclination angle θ of from 50 to 85 degrees, preferably 65 to 85 degrees with respect to the circumferential direction. In this region, the inclination angle θ can be constant, but in this example, it is gradually increased from the groove 3 to the tread edge E. If the inclination angle θ is less than 50 degrees, wear resistance of tread elements 12 and steering stability are liable to become worse. If the inclination angle θ is more 85 degrees, drainage from the main circumferential groove 3 tends to decrease. Owing to the alternate wide lateral grooves 5 and narrow lateral grooves 6, it is possible to reduce pitch noise. By combining with a pitch variation the noise reduction can be further enhanced.

Figure 2:
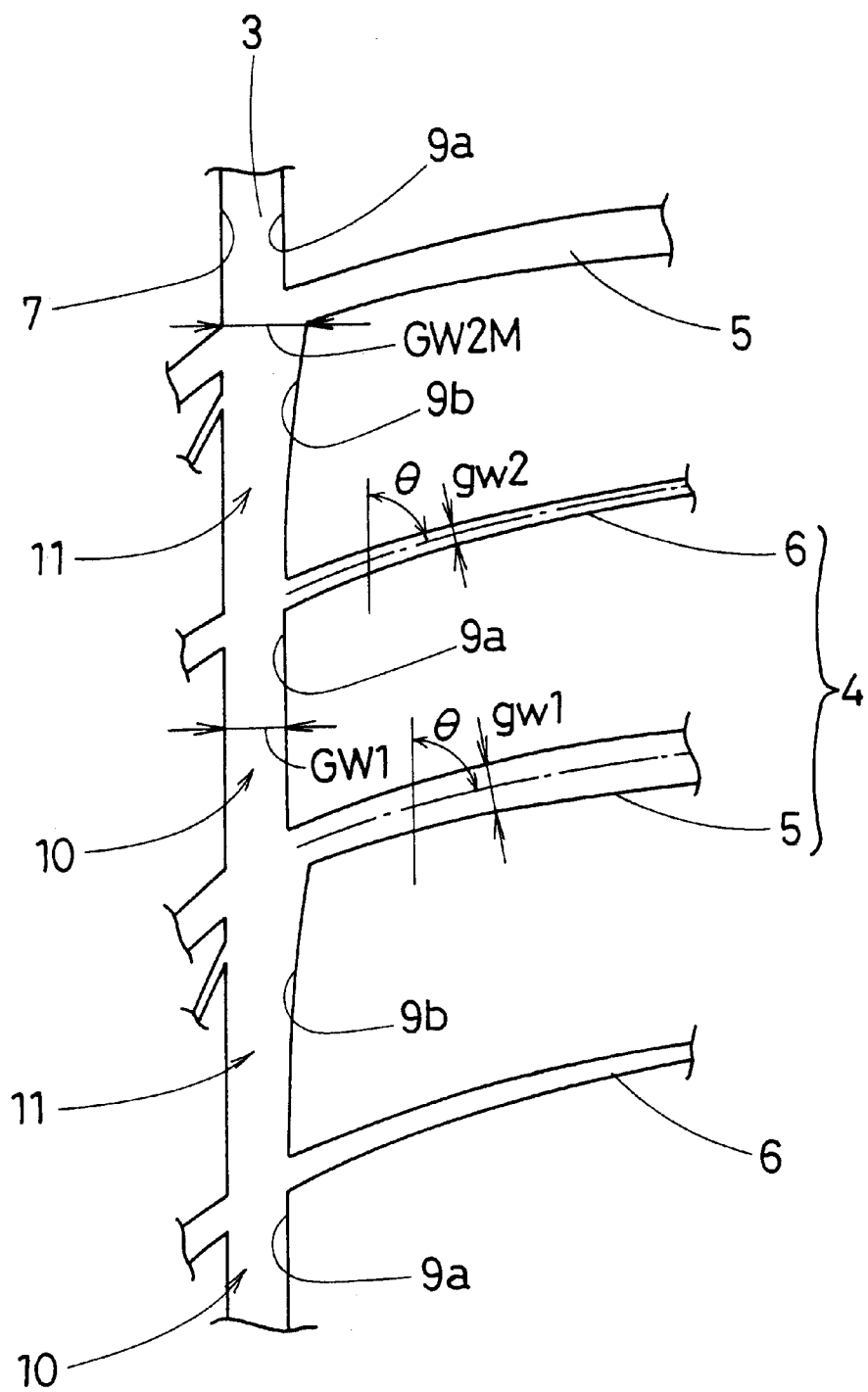
FIG. 2 shows the main circumferential groove and outer lateral grooves thereof.
Figure 3:
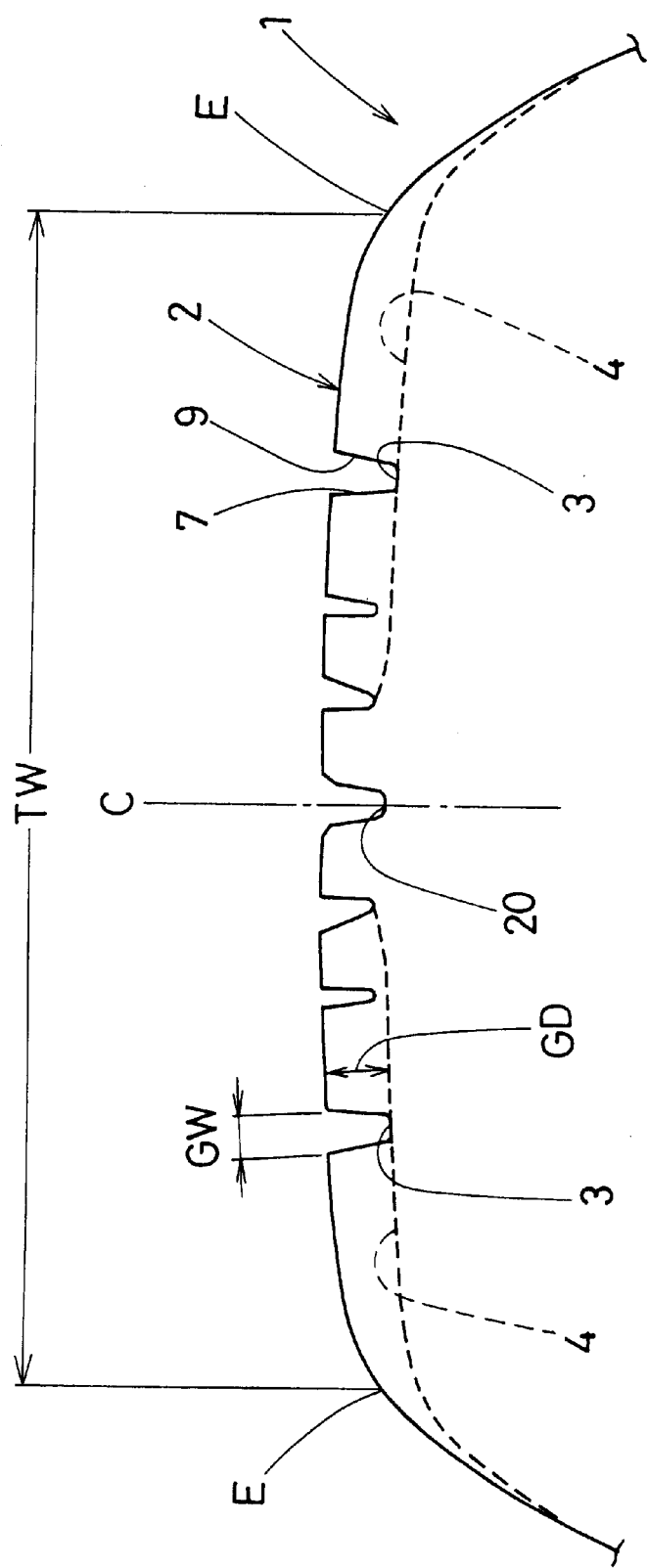
FIG. 3 is a schematic cross sectional view showing the tread contour.

The main circumferential groove 3 has, as shown in FIG. 2, an axially inner groove-wall 7 which extends substantially along a circumferential straight line.

On the other hand, the axially outer groove-wall 9 thereof comprises alternate circumferential portions 9a and inclined portions 9b, each defined between the circumferentially adjacent wide lateral groove 5 and narrow lateral groove 6. The circumferential portions 9a extend in parallel with the longitudinal direction of the main circumferential groove 3 or the circumferential direction, whereby the width of the main circumferential groove 3 is constant in these portions (constant width portion). The inclined portions 9b are inclined axially outwardly from the narrow lateral groove 6 to the wide lateral grooves 5, whereby the width of the main circumferential groove 3 gradually increases from the narrow lateral groove 6 to the wide lateral grooves 5 (widening portion). At the axially inner end of each narrow lateral groove 6, the end of the inclined portion 9b and the end of the circumferential portion 9a are positioned at the substantially same axial position.

Preferably, the ratio (Gw2M/Gw1) of the maximum groove width Gw2M in the widening portion 11 of the main groove 3 to the groove width Gw1 in the constant width portion 10 of the main groove 3 is set in a range of from 1.10 to 2.0, more preferably from 1.25 to 1.45, whereby the air-tube resonance in the main circumferential groove 3 can be prevented although it is a straight groove.

In this example, each inclined portion 9b is slightly convexly curved. However, various configurations, e.g. straight, concave, zigzag, wavy and the like may be used. The inclining directions of the inclined portions 9b are such that the inclined portions intersect the respective wide lateral grooves 5 at obtuse angles. In other words, the inclined portions 9b and the outer lateral grooves 4 are inclined towards the same direction. Therefore, flow of water from the main groove 3 to the wide lateral grooves 5 can be improved and as a result wet performance can be improved.

Figure 4:
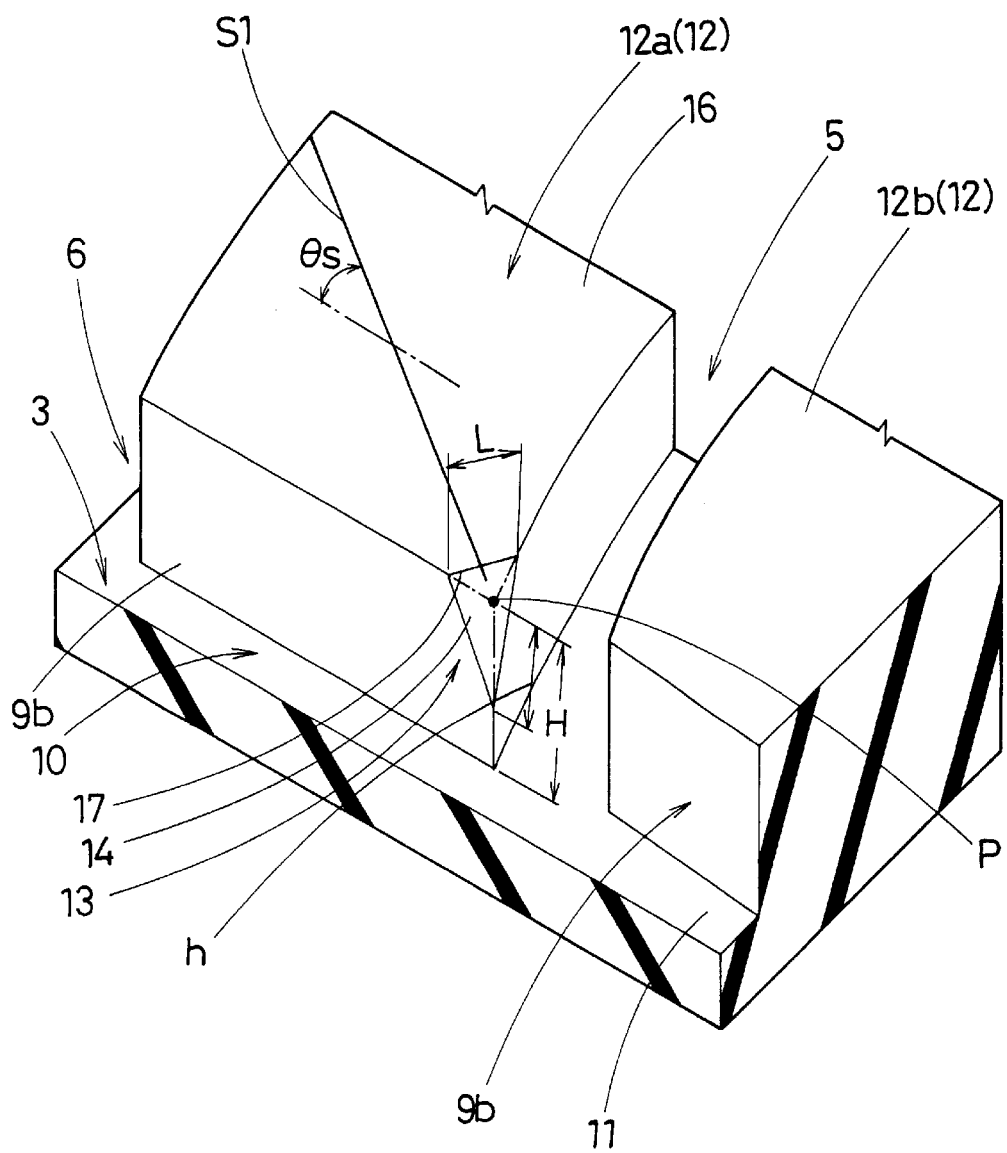
FIG. 4 is a perspective view of the tread elements.

Further, as shown in FIG. 4, acute angled corners 13 formed between the wide lateral grooves 5 and the constant width portions 10 of the main groove 3 are cut-out by a substantially flat triangular plane 14. The width L of the triangular plane 14 at the ground contacting surface 16 is preferably set in a range of from 2.0 to 6.0 mm, more preferably 4.0 to 5.0 mm. The triangular plane 14 is slopped toward the groove bottom, and the radially inner end thereof reaches to a depth (h) in a range of from 50 to 100%, preferably 80 to 90% of the height H of the tread element 12a or the groove depth H.

Such corner cut can be also provided for acute angled corners formed between the narrow lateral grooves 6 and the widening portions 11 of the main groove 3.

The corner cuts further improve the water flow from the main circumferential groove to the lateral grooves, and help to reduce the air-tube resonance in the main circumferential groove, and further can prevent the tread rubber from tearing off.

In order to adjust the tread rigidity to improve ride comfort, the tread portion 2 can be provided with sipes having a width of less than 1.5 mm, usually less than 1 mm. In this embodiment, two types of sipes S1 and S2 are provided. The sipe S1 has two open ends. The sipe S2 has an open end and a closed end.

Figure 5:
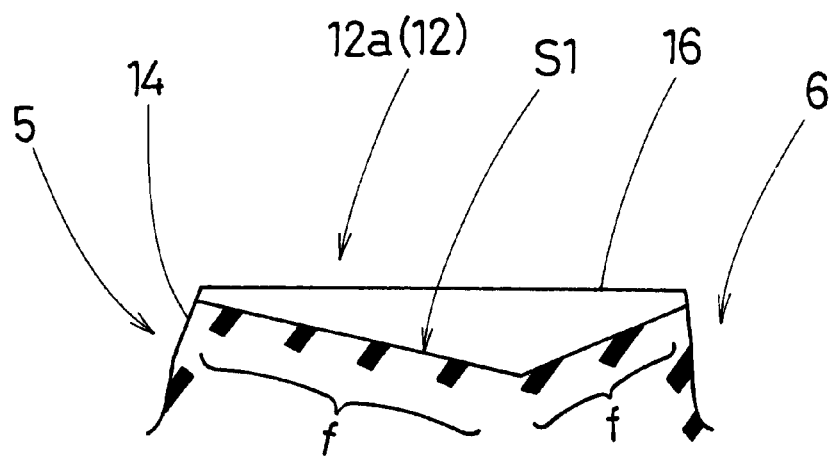
FIG. 5 is a cross sectional view taken along a sipe having open ends showing a variation of the depth thereof.

As shown in FIG. 1, shoulder blocks 12a with corner cut are each provided with a sipe S1 which starts from the cut-out corner and extends across the block 12a, while inclining toward the same direction as of the outer lateral grooves 4, and reaches to the adjacent narrow lateral groove 6 to open thereto. Thus, both the ends thereof are opened to the grooves. The inclination angle θs of the sipe S1 is set in a range of from 10 to 50 degrees, preferably 20 to 40 degrees with respect to the circumferential direction so as to be 25 to 65 degrees smaller than the inclination angle θ of the lateral grooves. The sipe S1 may have a constant depth. But, in order to improve the resistance to wear especially uneven wear such as heel & toe wear, the depth is gradually decreased towards its open ends or towards the lateral grooves as shown in FIG. 5. For example, the sipe S1 has a minimum depth of 1 mm at its open ends at the lateral grooves and a maximum depth of 5 mm between the ends. Each of the sipes S1 has an extension into the next shoulder block 12b which extends beyond the tread edge E. This extension is also the S1-type, that is, both the ends are opened.

Figure 6:
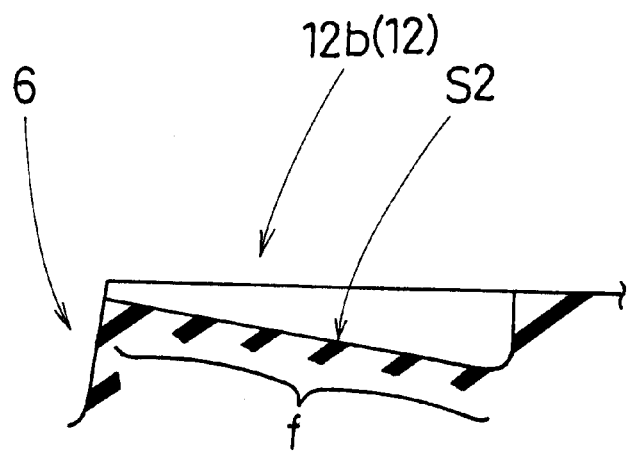
FIG. 6 is a cross sectional view taken along a sipe having an open end and closed end showing a variation of the depth thereof.

Each of the shoulder blocks 12b is provided with a sipe S2 which starts from the middle part of the inclined portion 9b and ends within this block 12b. Thus, each sipe S2 has an open end and a closed end. As shown in FIG. 6, the sipe S2 is also provided with a variable depth which gradually decreases from the closed end to the open end.

As to the central region of the tread portion 2 between the two main circumferential grooves 3, in this embodiment, there are provided with a central main circumferential groove 20 extending continuously in the circumferential direction along the tire equator C, and axially inner lateral grooves 21 extending axially inwardly from the main circumferential grooves 3.

The inner lateral grooves 21 include first inner lateral grooves 21a each extending on an extension of one of the wide lateral grooves 5, and second inner lateral grooves 21b each extending on an extension of one of the narrow lateral grooves 6, wherein the average width of the first grooves 21a is more than the average width of the second grooves 21b, and the first grooves 21a and second grooves 21b are arranged alternately in the circumferential direction.

The first inner lateral grooves 21a extend axially inwards, but do not contact with the central main circumferential groove 20. The first inner lateral grooves 21a are curved such that the inclination thereof gradually decreases as they approach to the central main circumferential groove 20, and finally they become substantially parallel to the circumferential direction. These parallel portions are aligned and connected with each other by narrower straight circumferential grooves 22. As a result, between the central circumferential groove 20 and each of the main circumferential grooves 3, a groove 25 extending continuously in the circumferential direction along a straight line is formed. Therefor, in this resultant groove 25, due to the narrower grooves 22, the groove width changes along its length and the occurrence of air tube resonance can be prevented.

The second inner lateral grooves 21b extend axially inward from the main circumferential groove 3, while inclining towards the same direction as other lateral grooves, but end at the middle point between the main circumferential groove 3 and central groove 20. With respect to the circumferential direction, the inclination angle thereof gradually decreases towards the axially inner end. From a middle point between the axially inner end and outer end, a narrower branch groove extends, in a direction reverse to that of an axially inner groove part between the above-mentioned inner groove end and branching point, to the main groove 3 near the intersecting point of the wide lateral groove 5 and main groove 3.

The above explained tread pattern is bi-directional, but it is also possible to provide a uni-directional tread pattern. Such a uni-directional tread pattern can be made based on the above explained bi-directional tread pattern, for example, by modifying one half on one side of the tire equator C to become symmetrical about the tire equator C and then circumferentially shifting the phase of one half from the other one half to remove periodicity.

Comparison Tests

Radial tires having the same structure except for the tread pattern were made and tested for the aquaplaning performance, noise performance, ride comfort and wear resistance, using a 1800 cc Japanese passenger car provided on all the four wheels with test tires inflated to 200 kPa. Tire size was 185/65R14 and the rim size was 5½ JJ X14. The test tires had the same carcass structure composed of a single ply of polyester cords arranged radially at an angle of 88 degrees with respect to the tire equator, and the same belt structure composed of two cross breaker plies. Ref. tire had a tread pattern similar to the tread pattern shown in FIG. 1 but the width of the main circumferential grooves 3 was constant along the length thereof.

Aquaplaning performance test: In a 100 m-radius asphalt-surfaced course provided with a 10 mm depth 20 m long water pool, lateral acceleration (lateral G) was measured on the front wheel, gradually increasing the approaching speed, to obtain the average lateral G from 50 km/h to 80 km/h. The results are indicated in Table 1 by an index based on Ref. tire being 100. The larger the value, the better the performance.

Noise performance test: During running the car on an even asphalt-surfaced road at a speed of 60 km/h, the pattern noise was evaluated by the test driver. The results are indicated in Table 1 by an index based on Ref. tire being 100. The smaller the value, the better the pattern noise.

Ride comfort test: During running the car on an uneven roads including rough asphalt road, stone-paved road and graveled road, the test driver evaluated ride comfort from harshness, thrust, damping etc. The results are indicated in Table 1 by an index based on Ref. tire being 100. The larger the value, the better the ride comfort.

Wear resistance test: During running the car for 500 km at a speed of 100 km/h, the brakes of 0.45 G were applied four times per 3 km. Then, the difference of wear at the circumferential ends (namely heel and toe edges) of the shoulder blocks 12a from that in the middle thereof was measured. The results are indicated in Table 1 by an index based on Ref. tire being 100. The larger the value, the better the wear resistance.

TABLE 1

| Tire | Ref. | Ex.1 | Ex.2 | Ex.3 | Ex.4 | Ex.5 | Ex.6 | Ex.7 | Ex.8 |
|---|---|---|---|---|---|---|---|---|---|
| Lateral groove | | | | | | | | | |
| Wide groove | | | | | | | | | |
| av. width gw1a (mm) | 4.2 | 4.2 | 4.2 | 4.2 | 4.2 | 4.2 | 4.2 | 4.2 | 4.2 |
| av. angle θ (deg.) | 77 | 77 | 77 | 77 | 77 | 77 | 77 | 77 | 77 |
| Narrow groove | | | | | | | | | |
| av. width gw2a (mm) | 2.8 | 2.8 | 2.8 | 2.8 | 2.8 | 1.7 | 2.8 | 2.8 | 2.8 |
| av. angle θ (deg.) | 77 | 77 | 77 | 77 | 77 | 77 | 77 | 77 | 77 |
| gw1a/gw2a | 1.5 | 1.5 | 1.5 | 1.5 | 1.5 | 2.5 | 1.5 | 1.5 | 1.5 |
| Main circumferential groove | | | | | | | | | |
| Constant width portion | | | | | | | | | |
| Groove width GW1 (mm) | 5.6 | 5.6 | 5.6 | 5.6 | 5.6 | 5.6 | 5.6 | 5.6 | 5.6 |
| Widening portions | | | | | | | | | |
| Max. groove width GW2M (mm) | 5.6 | 8.4 | 6.2 | 11.2 | 7.6 | 8.4 | 8.4 | 8.4 | 8.4 |
| GW2M/GW1 | 1 | 1.5 | 1.1 | 2 | 1.35 | 1.5 | 1.5 | 1.5 | 1.5 |
| Corner cut | | | | | | | | | |
| h/H | 0 | 0 | 0 | 0 | 0 | 0 | 0 | 0 | 0.88 |
| L (mm) | 0 | 0 | 0 | 0 | 0 | 0 | 0 | 0 | 5 |
| Sipes S1 | | | | | | | *1 | *2 | |
| Depth (mm) | 0 | 0 | 0 | 0 | 0 | 0 | 5 | 1–3 | 0 |
| Test results | | | | | | | | | |
| Aquaplaning performance | 100 | 105 | 102 | 107 | 105 | 105 | 105 | 105 | 106 |
| Noise performance | 100 | 99 | 100 | 98 | 100 | 102 | 100 | 100 | 100 |

TABLE 1-continued

| Tire | Ref. | Ex.1 | Ex.2 | Ex.3 | Ex.4 | Ex.5 | Ex.6 | Ex.7 | Ex.8 |
|---|---|---|---|---|---|---|---|---|---|
| Ride comfort | 100 | 100 | 100 | 100 | 100 | 100 | 102 | 102 | 100 |
| Wear resistance | 100 | 102 | 100 | 105 | 102 | 102 | 98 | 100 | 103 |

*1) Constant depth
*2) Variable depth shown in FIG. 5

What is claimed is:

1. A pneumatic tire comprising a tread portion provided between the tire equator and each tread edge with a circumferentially continuous main circumferential groove and circumferentially spaced outer lateral grooves, said outer lateral grooves including wide lateral grooves and narrow lateral grooves alternately arranged in the tire circumferential direction, each extending axially outwardly from the main circumferential groove while inclining at a certain angle with respect to the circumferential direction of the tire, said main circumferential groove having an axially inner groove-wall and an axially outer groove-wall, said axially inner groove-wall extending substantially straight in the circumferential direction, said axially outer groove-wall comprising alternating circumferential portions and inclined portions with each portion extending between one of the wide lateral grooves and one of the narrow lateral grooves, the circumferential portions extending substantially straight in the circumferential direction so that the width of the main circumferential groove is substantially constant, and the inclined portions inclined so that the width of the main circumferential groove along each inclined portion increases from an adjoining narrow lateral groove to an adjoining wide lateral groove whereby the main circumferential groove has alternate constant width portions and widening portions.

2. The pneumatic tire according to claim 1, wherein the widening portions have a maximum groove width Gw2M in a range of from 1.10 to 2.0 times a groove width Gw1 of the constant width portions, and the average groove width gw1a of the wide lateral grooves is in a range of from 1.20 to 3.50 times the average groove width gw2a of the narrow lateral grooves.

3. The pneumatic tire according to claim 1, wherein on each side of the tire equator, the inclined portions and the lateral grooves are inclined toward the same direction, and corners between the constant width portions of the main circumferential groove and the wide lateral grooves are cut-out.

4. The pneumatic tire according to claim 3, wherein the tread portion is provided with sipes each extending from one of the cut-out corners, while inclining toward the same direction as of the lateral grooves, to the adjacent narrow lateral groove.

5. A pneumatic tire comprising:

a tread portion provided between the tire equator and each tread edge with a circumferentially continuous main circumferential groove and circumferentially spaced outer lateral grooves, said outer lateral grooves including wide lateral grooves and narrow lateral grooves alternately arranged in the tire circumferential direction, each extending axially outwardly from the main circumferential groove while inclining at a certain angle with respect to the circumferential direction of the tire, said main circumferential groove having an axially inner groove-wall and an axially outer groove-wall, said axially inner groove-wall extending substantially straight in the circumferential direction, said axially outer groove-wall comprising alternating circumferential portions and inclined portions with each portion extending between one of the wide lateral grooves and one of the narrow lateral grooves, the circumferential portions extending substantially straight in the circumferential direction so that the width of the main circumferential groove is substantially constant, and the inclined portions inclined so that the width of the main circumferential groove along each inclined portion increases from an adjoining narrow lateral groove to an adjoining wide lateral groove whereby the main circumferential groove has alternate constant width portions and widening portions, wherein the outer lateral grooves extend to the tread edges and wherein the axially inner groove-wall of said main circumferential groove extends substantially along a circumferential straight line.

\* \* \* \* \*